(12) United States Patent
Xin

(10) Patent No.: US 11,728,482 B2
(45) Date of Patent: Aug. 15, 2023

(54) DOPING STRATEGY FOR LAYERED OXIDE ELECTRODE MATERIALS USED IN LITHIUM-ION BATTERIES

(71) Applicant: THE REGENTS OF THE UNIVERSITY OF CALIFORNIA, Oakland, CA (US)

(72) Inventor: Huolin Xin, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/508,540

(22) Filed: Oct. 22, 2021

(65) Prior Publication Data

US 2022/0336804 A1   Oct. 20, 2022

Related U.S. Application Data

(63) Continuation-in-part of application No. 17/358,460, filed on Jun. 25, 2021.

(60) Provisional application No. 63/044,183, filed on Jun. 25, 2020.

(51) Int. Cl.
| | |
|---|---|
| *H01M 4/525* | (2010.01) |
| *H01M 4/505* | (2010.01) |
| *H01M 10/0525* | (2010.01) |
| *C01G 53/00* | (2006.01) |
| *H01M 4/02* | (2006.01) |

(52) U.S. Cl.
CPC ............ *H01M 4/525* (2013.01); *C01G 53/50* (2013.01); *H01M 4/505* (2013.01); *H01M 10/0525* (2013.01); *C01P 2002/52* (2013.01); *C01P 2002/72* (2013.01); *C01P 2002/88* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| 7,488,465 B2 | 2/2009 | Eberman et al. |
| 2022/0336802 A1 | 10/2022 | Xin |
| 2022/0336804 A1 | 10/2022 | Xin |

FOREIGN PATENT DOCUMENTS

| CN | 110474035 A | 11/2019 |
| WO | 2014136760 A1 | 9/2014 |

OTHER PUBLICATIONS

Yu et al. "Mitigating voltage and capacity fading of lithium-rich layered cathodes by lanthanum doping." Journal of Power Sources 335 (2016): 65-75.
Zheng et al. "Host structural stabilization of Li1.232Mn0.615Ni0.154O2 through K-doping attempt: toward superior electrochemical performances." Electrochimica Acta 188 (2016): 336-343.
Zhang et al. "Compositionally complex doping for zero-strain zero-cobalt layered cathodes." Nature 610.7930 (2022): 67-73.

*Primary Examiner* — Tanisha Diggs
(74) *Attorney, Agent, or Firm* — Nguyen Tarbet LLC

(57) ABSTRACT

The present invention features a new way of doping layered cathode materials in lithium ion batteries. Using a "high entropy" doping strategy, more than four impurity elements can be introduced to the host materials. The present invention applies this high entropy doping strategy to a high nickel content layered oxide material and a lithium-manganese rich material. This new high entropy doping strategy allows the layered oxide materials used in the positive electrode of lithium ion battery to achieve high energy density, long life cycle and reduced reliance on the expensive and toxic cobalt, all of which are desired attributes for improving the performance of lithium ion batteries and reducing their cost.

19 Claims, 13 Drawing Sheets
(13 of 13 Drawing Sheet(s) Filed in Color)

DOPING STRATEGY FOR LAYERED OXIDE ELECTRODE MATERIALS USED IN LITHIUM-ION BATTERIES

CROSS-REFERENCES TO RELATED APPLICATIONS

This application is a continuation-in-part and claims benefit of U.S. patent application Ser. No. 17/358,460 filed Jun. 25, 2021, which is a non-provisional and claims benefit of U.S. Provisional Application No. 63/044,183 filed Jun. 25, 2020, the specification(s) of which is/are incorporated herein in their entirety by reference.

STATEMENT REGARDING FEDERALLY SPONSORED RESEARCH OR DEVELOPMENT

This invention was made with government support under Grant No. DE-EE0008444 awarded by DOE. The government has certain rights in the invention.

FIELD OF THE INVENTION

The invention relates to a composition for a new positive electrode material more particularly to a composition used in a lithium ion battery that has high energy density, long life cycle and reduced reliance on the toxic cobalt.

BACKGROUND OF THE INVENTION

Efforts to develop "next generation" battery cells and modules that reduce battery cost, increase battery life, and improve performance and safety are essential to deploying lithium ion batteries in vehicles and grid power systems. Reducing battery cost by reducing prohibitively high-cost materials is key for any development strategy. The price of cobalt, a key element in lithium-ion batteries (LIB) for stability, has nearly tripled over the past few years due to increased demand from the cell phone industry, current materials shortage, and speculation on a future global shortage. Another essential element, nickel, used in LIB battery packs for electric vehicles (EVs), has seen a similar problem. Its worldwide production had been relatively flat for the past several years despite a steady increase in demand. But in just the first half of 2019, nickel prices rose by more than a third, with prices expected to increase even more.

By replacing Co in $LiCoO_2$ with Ni and Mn, the cathode materials can have high capacity and high energy density. For example, $LiNi_{0.33}Mn_{0.33}Co_{0.33}O_2$ has been commercialized and widely deployed in battery packs in electric vehicles. In the past few years, materials with higher Ni content, such as $LiNi_{0.5}Mn_{0.3}Co_{0.02}O_2$, $LiNi_{0.6}Mn_{0.2}Co_{0.2}O_2$, and $LiNi_{0.8}Mn_{0.1}Co_{0.1}O_2$ have been developed and are on the verge of market penetration. However, all five of these materials have Co, which is undesired. Cobalt has been widely considered essential for the whole class of layered oxide materials. It has recently been shown that the Mn and Co can be fully eliminated from the cathode chemistry by TiMg co-doping. The successful chemistry developed is $LiNi_{0.96}Ti_{0.02}Mg_{0.02}O_2$ (ref: Chemistry of Materials 31 (23), 9769-9776). However, one of the problems with $LiNiO_2$ material is that it at high charge voltages between 4.2-4.4 voltage (at >75% of delithiation), it has an undesired H2 to H3 two-phase transition, i.e., the oxygen lattice in the material will transform from a cubic close packed structure to a hexagonal close packed structure. A recent electron microscopy study showed that the stacking fault formed in the H3 phase accelerates the oxygen release. This problem persists in $LiNi_{0.96}Ti_{0.02}Mg_{0.02}O_2$: co-doping with 2% of Ti and 2% Mg is not sufficient to fully eliminate the two-phase transition.

Apart from the stoichiometric layered oxide, i.e., oxides that follow the following formula $Li_1M_1O_2$, lithium-rich materials, i.e., $Li_{1+x}M_{1-x}O_2$, x>0, can offer capacity much higher than $Li_1M_1O_2$. However, this class of materials is known to have a short life cycle. This class of materials after surface passivation can have much improved capacity retention. However, one of the unsolved problems of this material is that it has a rapid voltage fading problem. Basically, even though the capacity retention is good, the energy retention of these materials is still poor.

Low-cost elements such as Titanium (Ti), Molybdenum (Mo), Zinc (Zn) and more expensive elements such as Niobium (Nb), Yttrium (Y), Zirconium (Zr), Scandium (Sc), Vanadium (V), and Chromium (Cr) can stabilize the surface rock salt layer for Nickel (Ni—), Manganese (Mn—), and Cobalt (Co—) containing layered oxides. These elements can improve oxygen retention on the surface of lithium-containing layered oxides. Furthermore, Yttrium (Y), Boron (B), Magnesium (Mg), Titanium (Ti), Tungsten (W), Antimony (Sb), Tantalum (Ta), and Aluminum (Al) can also improve the thermal stability of $LiNiO_2$ and in principle have oxygen retaining effects in $LiNiO_2$. However, these elements tend to intermix with lithium, reducing battery capacity when doped above the 2% doping threshold. Therefore, it is difficult to use a single dopant to acquire the desired oxygen retention effect.

A second consideration is based on reducing strain and impeding the development of defects in the layered material, particularly when they are charged to high voltages. During that charging process, lithium is extracted from the cathode material, and undesired strain and defects are developed due to volume change and phase transition.

BRIEF SUMMARY OF THE INVENTION

It is an objective of the present invention to provide a composition for a new positive electrode material that can be used in a lithium ion battery that allows for high energy density, a long life cycle, and reduced reliance on the toxic cobalt, as specified in the independent claims. Embodiments of the invention are given in the dependent claims. Embodiments of the present invention can be freely combined with each other if they are not mutually exclusive.

In some aspects, the present invention features a composition for use in a cathode for a lithium ion battery. In some embodiments, the composition may be represented by the formula $LiNi_{0.33}Mn_{0.03}Ti_{0.02}Mg_{0.02}Mo_{0.02}Nb_{0.01}O_2$, $LiNi_{0.8}Mn_{0.13}Ti_{0.02}Mg_{0.02}Mo_{0.02}Nb_{0.01}O_2$, $LiNi_{0.7}Mn_{0.23}Ti_{0.02}Mg_{0.02}Mo_{0.02}Nb_{0.01}O_2$, $LiNi_{0.6}Mn_{0.33}Ti_{0.02}Mg_{0.02}Mo_{0.02}Nb_{0.01}O_2$, or $LiNi_{0.5}Mn_{0.43}Ti_{0.02}Mg_{0.02}Mo_{0.02}Nb_{0.01}O_2$.

In other embodiments, the composition is represented by the formula $Li_{1.2}Mn_{0.54}Ni_{0.13}Co_{0.091}Ti_{0.0078}Mo_{0.0078}Nb_{0.0078}Ta_{0.00078}Sb_{0.0078}O_2$. In this embodiment, the cobalt content is low and is used for structural stability of the material.

One of the unique and inventive technical features of the present invention is the use of 4 or 5 elements as dopants. Without wishing to limit the invention to any theory or mechanism, it is believed that the technical feature of the present invention advantageously provides for improved oxygen retention and stability to allow for a longer life cycle. The improved structural stability and life cycle of the compositions described herein may be attributed to the following aspects: (1) mitigated surface oxygen loss due to the pinning effects of the hierarchically and randomly distributed dopants; (2) reduced lattice expansion/contraction and defects generation through strain accommodation by different chemical environments; and (3) suppressed cation mixing through solute-drag effects of the multi-component dopants in TM layers. The intrinsically enhanced stability through high-entropy doping ensures the stability of the cathode composition in terms of life cycle and stability. None of the presently known prior references or work has the unique inventive technical feature of the present invention.

Furthermore, the prior references teach away from the present invention. For example, those skilled in the art stick with one or two dopants because it is simpler and easier to understand. Additionally, as more dopants are used, the more complicated the material becomes and its hard to know what each dopant is doing. Furthermore, the inventive technical features of the present invention contributed to a surprising result. For example, the stability of the materials improved significantly over those that use cobalt—it is a conventional wisdom that cobalt is the only cure for $LiNiO_2$'s degradation and thermal stability problem.

Another unique and inventive feature of the present invention is that it provides novel compositions of high entropy metal alloys (an alloy that has more than four metal elements) with improved mechanical properties. Without wishing to limit the present invention to any particular theory or mechanism, local ordering (or compositional heterogeneity at the nanoscale) could frustrate the material and block the development of defects and dislocations like precipitates do in traditional alloys. The novel compositions of the present invention may allow for high entropy doping in layered oxides that could block unwanted structural transformation during charging, like what occurs in the two-phase transition in $LiNiO_2$.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

Figure 7:
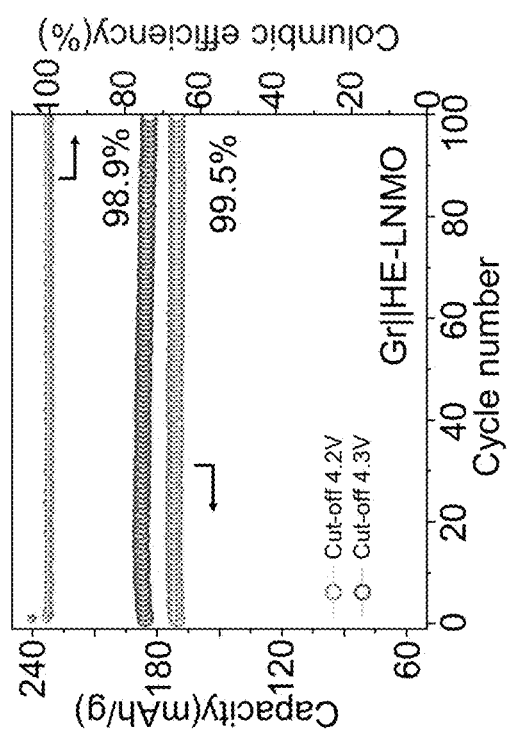

FIG. 7 shows that the $LiNi_{0.8}Mn_{0.13}Ti_{0.02}Mg_{0.02}Mo_{0.02}Nb_{0.01}O_2$ (HE-LNMO) has extremely good stability in graphite full cells. With a cut-off voltage of 4.3V and 4.2V vs. graphite, the capacity retention is 98.9% and 99.5% after 100 cycles respectively.

Figure 8A:
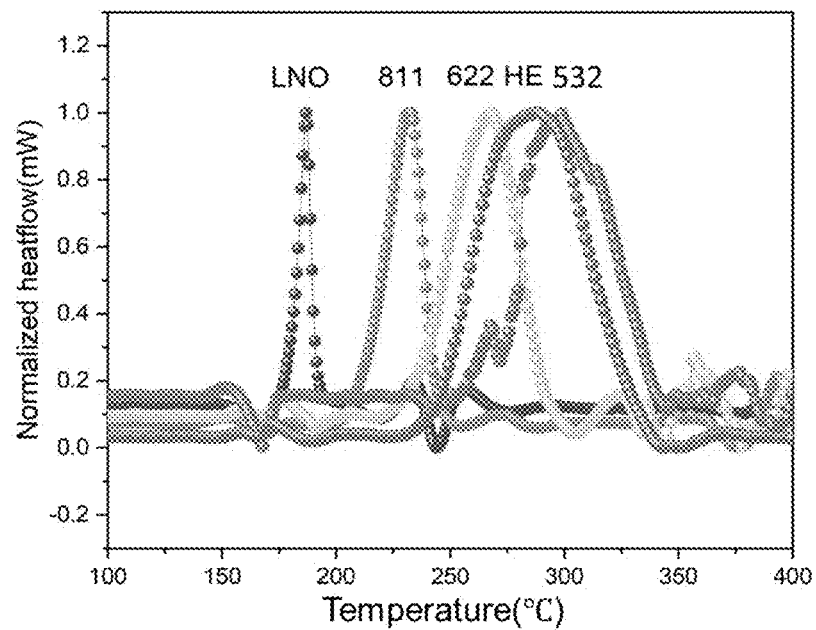
Figure 8B:
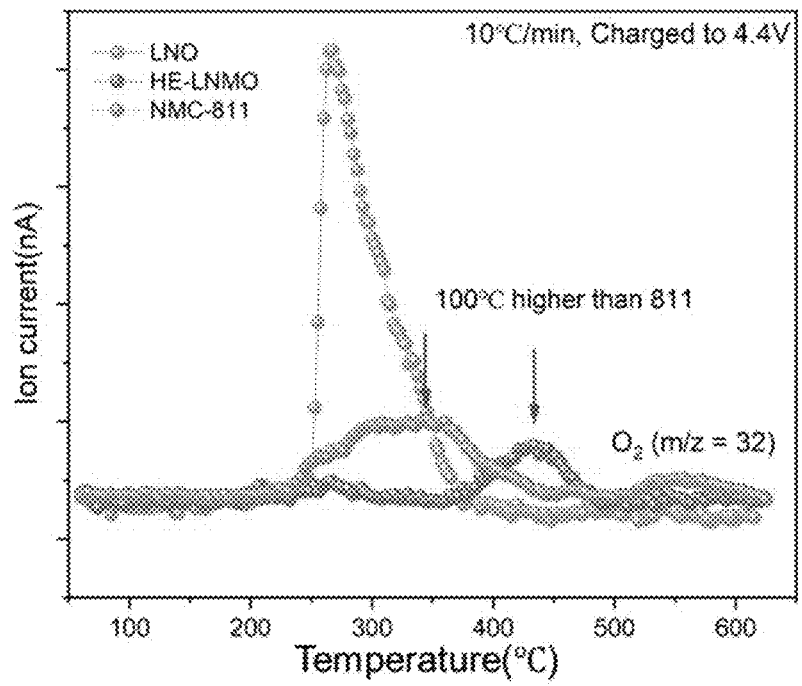

FIGS. 8A-8B show that the $LiNi_{0.8}Mn_{0.13}Ti_{0.02}Mg_{0.02}Mo_{0.02}Nb_{0.01}O_2$ (HE-LNMO) has extremely good thermal stability. From DSC (FIG. 8A) and TGA-MS (FIG. 8B) measurements, the HE-LNMO material is about 100° C. more stable than the $LiNi_{0.8}Mn_{0.1}Co_{0.1}O_2$ (NMC-811) material. The thermal stability of the HE-LNMO material is comparable to $LiNi_{0.5}Mn_{0.3}Co_{0.2}O_2$ (NMC-532). This measurement supports that the high-entropy "cocktail" effect can improve the structural stability of high-Ni content material at highly charged states.

Figure 9A:
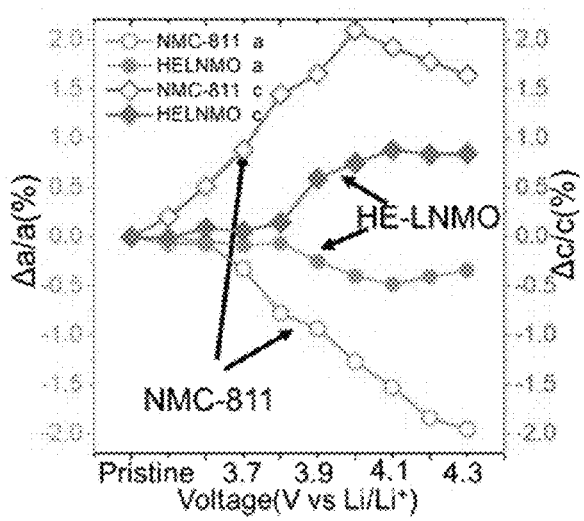
Figure 9B:
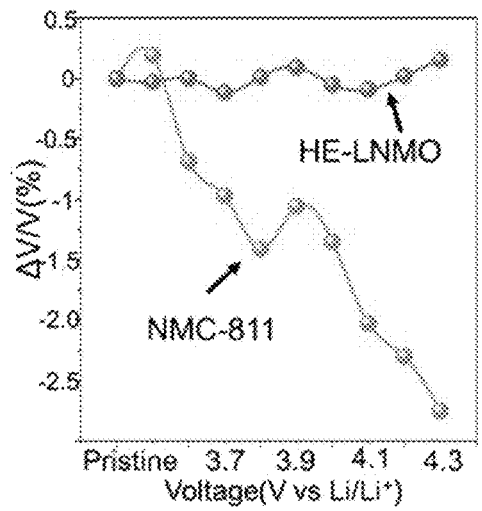
Figure 9C:
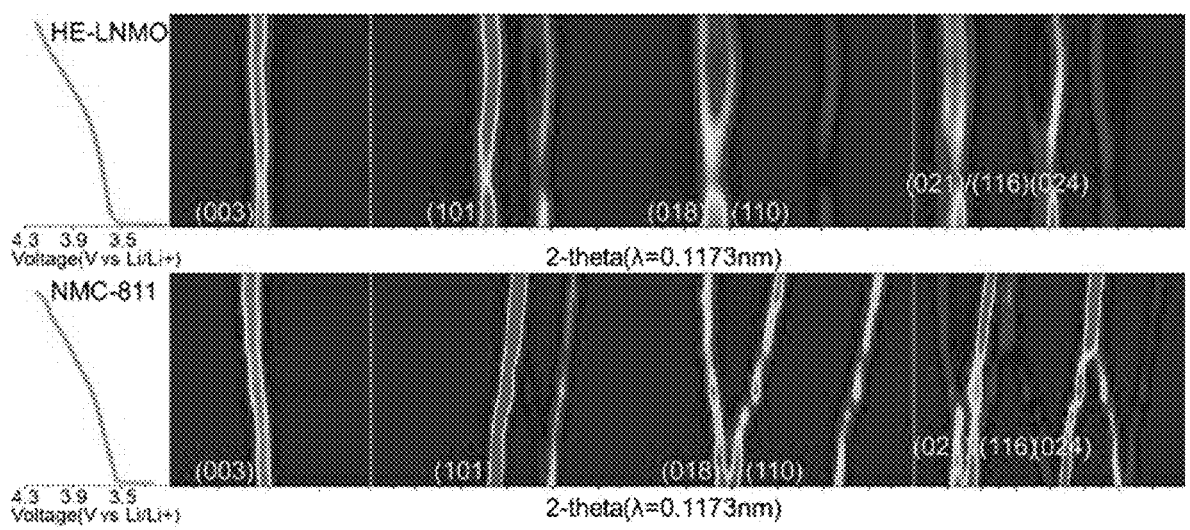

FIGS. 9A-9C show that the $LiNi_{0.8}Mn_{0.13}Ti_{0.02}Mg_{0.02}Mo_{0.02}Nb_{0.01}O_2$ (HE-LNMO) also has a zero-strain property, i.e., the material has nearly zero volume change as it is charged to 4.3 V vs Li/Li$^+$. The a and b lattice parameters are extracted from the XRD data shown in FIG. 9C. The volume expansion is then calculated by calculating the volume of the material unit cell as shown in FIG. 9B. Compared with $LiNi_{0.8}Mn_{0.1}Co_{0.1}O_2$ (NMC-811), the HE-LNMO material has nearly no volume change up to 4.3 V vs Li/Li$^+$. This is a special mechanical property that is realized by the high-entropy doping strategy. This property is critically important for improving the life cycle of cathode materials as volume expansion can cause mechanical degradation of the cathode.

Figure 10A:
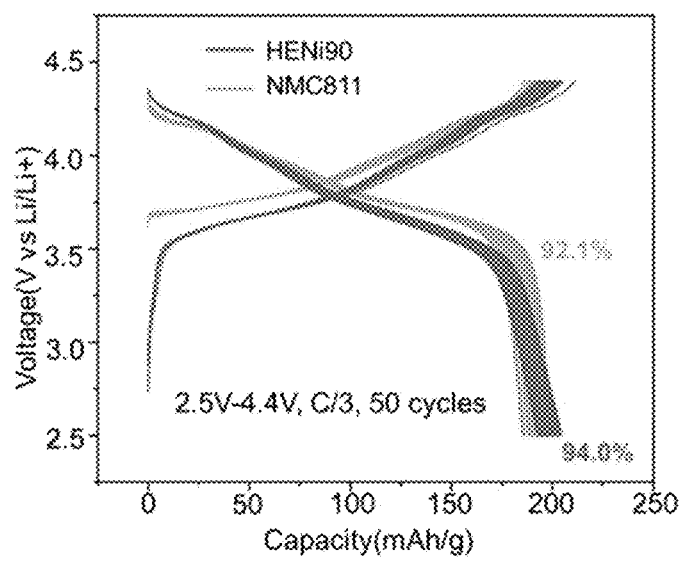
Figure 10B:
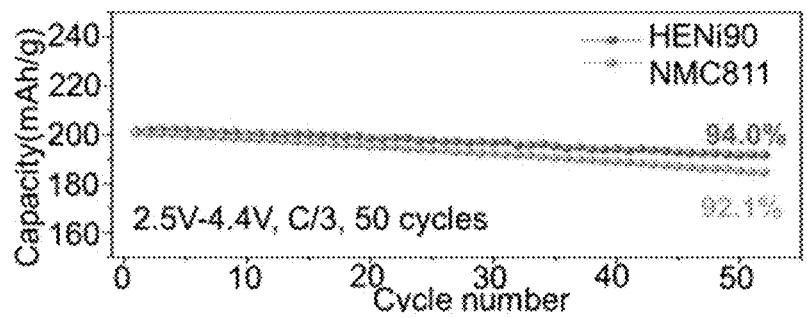

FIGS. 10A-10B show the charge/discharge curve and cycle stability of $LiNi_{0.9}Mn_{0.03}Ti_{0.02}Mg_{0.02}Mo_{0.02}Nb_{0.01}O_2$ (HE-Ni90) and NMC-811 (2.5V-4.4V, C/3). Compared with NMC-811, HE-Ni90 shows better capacity retention at a higher Ni-level.

Figure 10C:
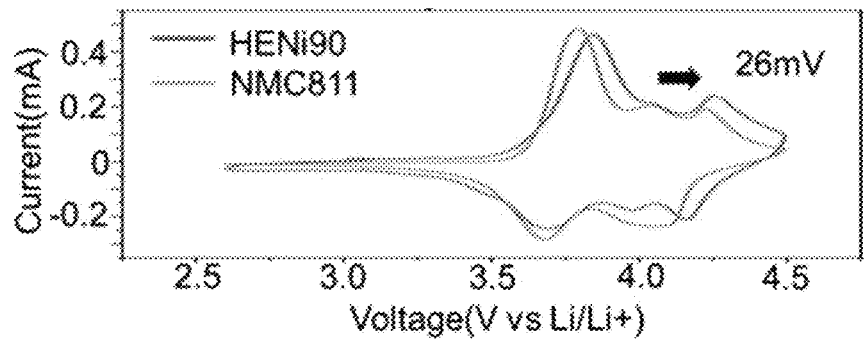

FIG. 10C shows the CV curve of HE-Ni90 and NMC-811 in a half-cell (2.6V-4.5V).

Figure 11A:
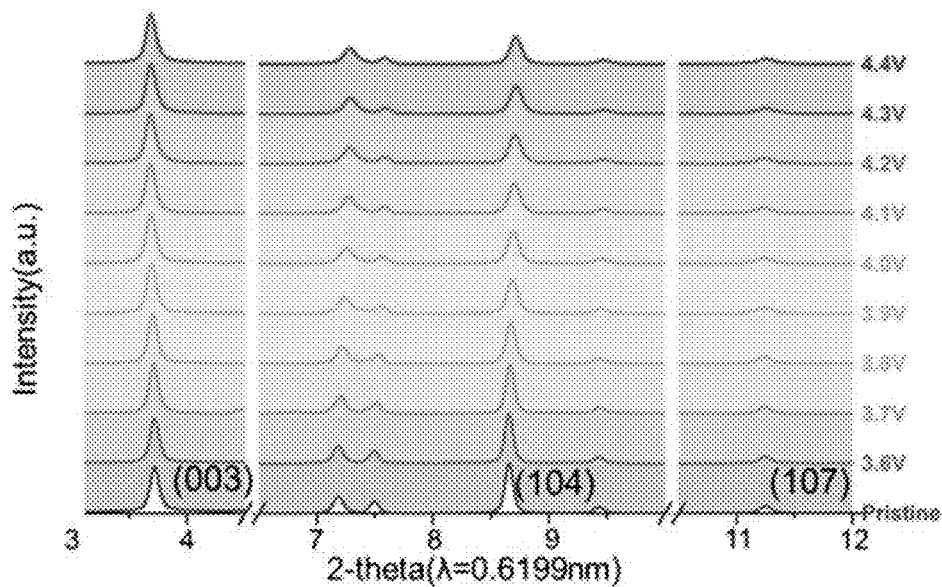
Figure 11B:
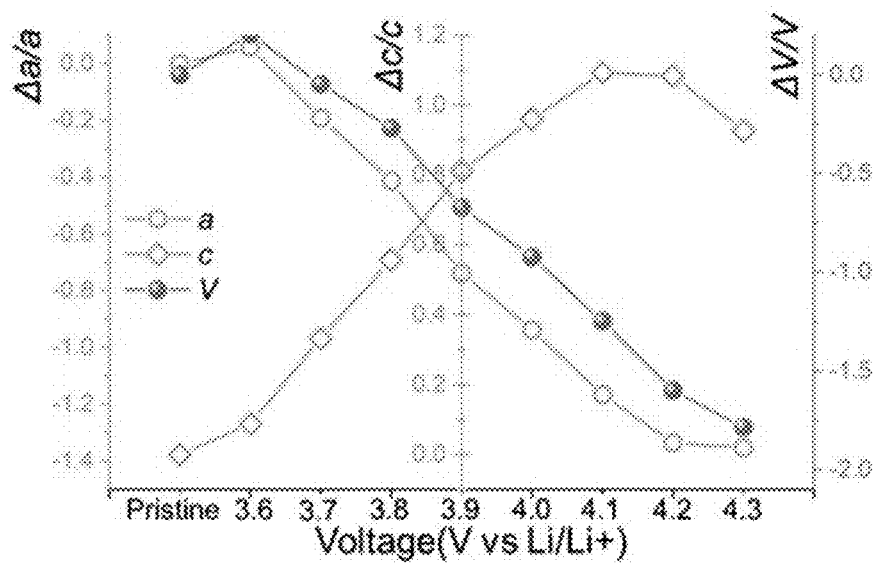

FIGS. 11A-11B show the ex-situ XRD and lattice change of $LiNi_{0.9}Mn_{0.03}Ti_{0.02}Mg_{0.02}Mo_{0.02}Nb_{0.01}O_2$ (HE-Ni90)

during delithiation. FIG. 11A shows the ex-situ XRD of HE-Ni90 at different charge cut-off voltages. FIG. 11B shows lattice parameter (a and c) and volume changes during the charge process based on the ex-situ XRD pattern.

Figure 12A:
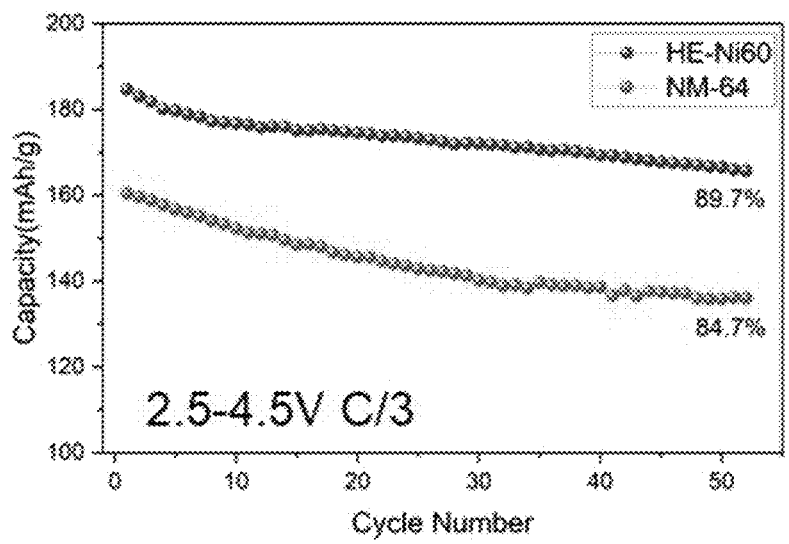
Figure 12B:
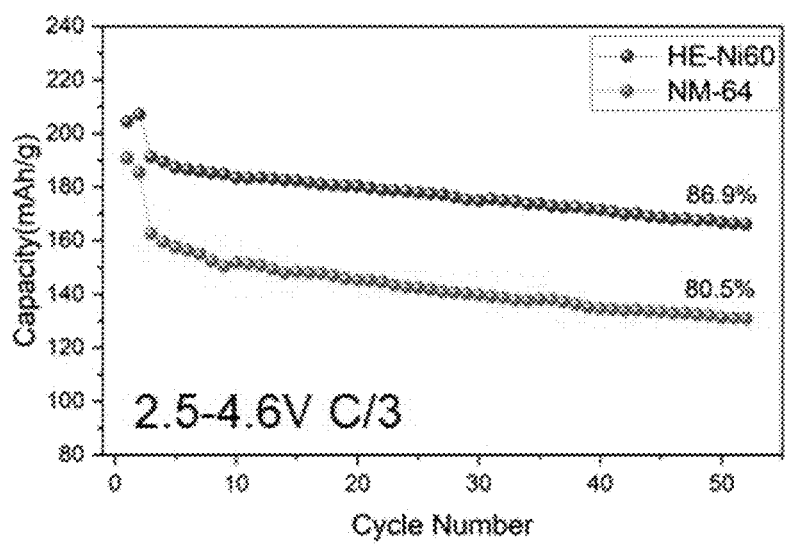

FIGS. 12A-12B show the cycling stability of $LiNi_{0.6}Mn_{0.33}Ti_{0.02}Mg_{0.02}Mo_{0.02}Nb_{0.01}O_2$ (HE-Ni60) and $LiNi_{0.6}Mn_{0.4}O_2$ (NM-64) (2.5V-4.4V, C/3). Compared with NM-64, HE-Ni60 shows better capacity retention.

Figure 12C:
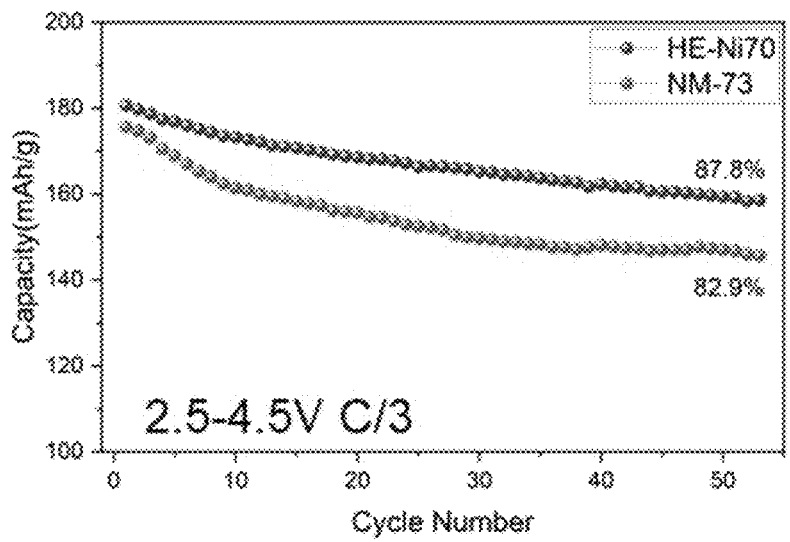
Figure 12D:
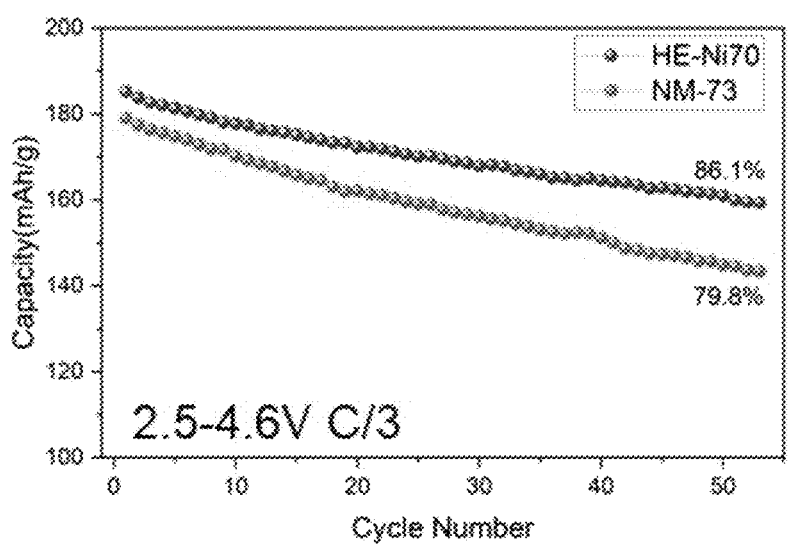

FIGS. 12C-12D show the cycling stability of $LiNi_{0.7}Mn_{0.23}Ti_{0.02}Mg_{0.02}Mo_{0.02}Nb_{0.01}O_2$ (HE-Ni70) and $LiNi_{0.7}Mn_{0.3}O_2$ (NM-73) (2.5V-4.4V, C/3). Compared with NM-73, HE-Ni70 shows better capacity retention.

Figure 13A:
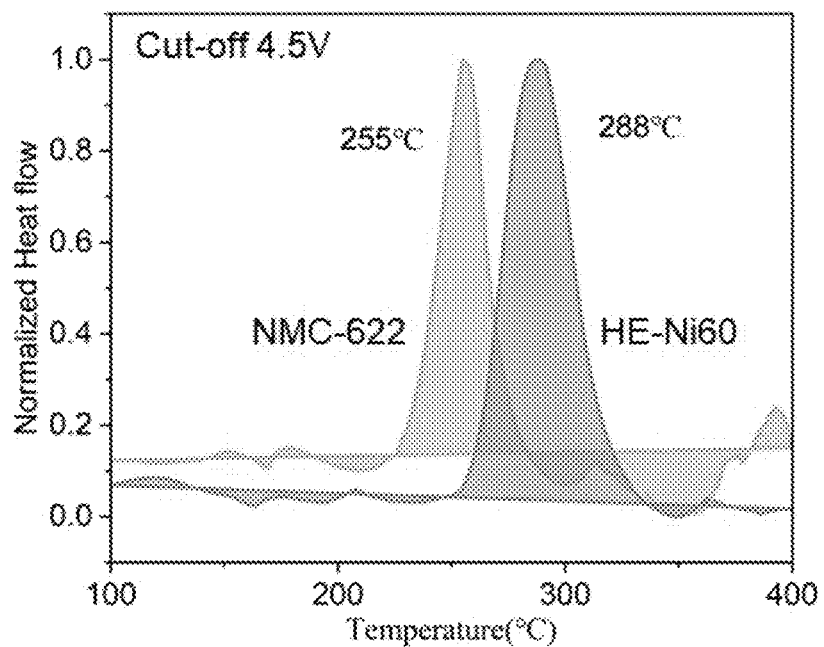

FIG. 13A shows the thermal stability of $LiNi_{0.6}Mn_{0.33}Ti_{0.02}Mg_{0.02}Mo_{0.02}Nb_{0.01}O_2$ (HE-Ni60) vs $LiNi_{0.8}Mn_{0.2}Co_{0.2}O_2$ (NMC-622). Compared with commercial NMC-622, HE-Ni60 shows 33 degrees Celsius higher thermal stability.

Figure 13B:
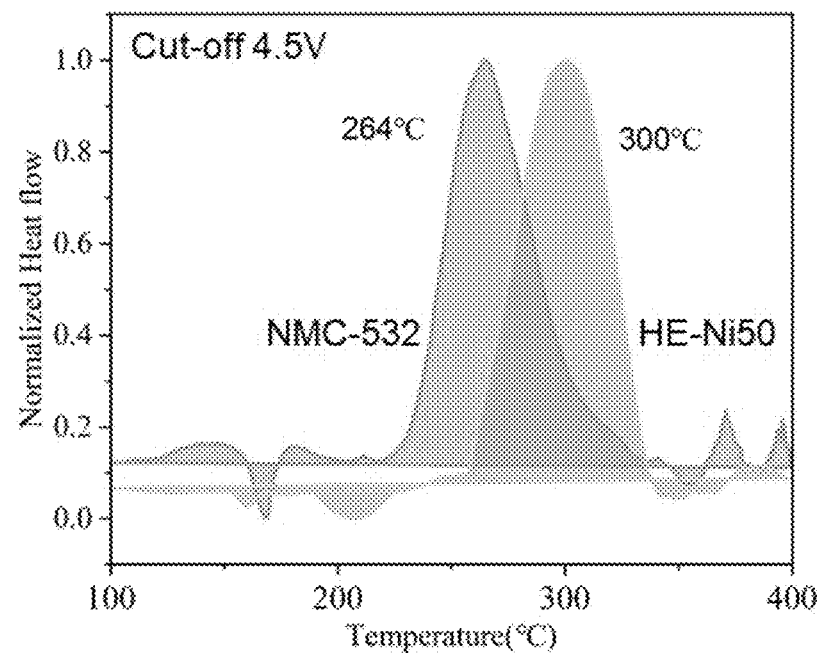

FIG. 13B shows the thermal stability of $LiNi_{0.5}Mn_{0.43}Ti_{0.02}Mg_{0.02}Mo_{0.02}Nb_{0.01}O_2$ (HE-Ni50) vs $LiNi_{0.5}Mn_{0.3}Co_{0.2}O_2$ (NMC-532). Compared with commercial NMC-532, HE-Ni50 shows 36 degrees Celsius higher thermal stability.

DETAILED DESCRIPTION OF THE INVENTION

For purposes of summarizing the disclosure, certain aspects, advantages, and novel features of the disclosure are described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Additionally, although embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. Moreover, while a number of variations have been shown and described in varying detail, other modifications, which are within the scope of the present disclosure, will be readily apparent to those of skill in the art based upon this disclosure. It is also contemplated that various combinations or sub combinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described herein.

As used herein, the terms "high-entropy doping strategy" or "cocktail doping strategy" may refer to a method that allows a minimum of four impurity elements to be introduced into the host materials. As used herein "host materials" may refer to any layered cathode materials used in lithium-ion batteries, including, but not limited to, lithium nickelate and Li-manganese-rich nickel-manganese-cobalt oxide.

As used herein, the term "life cycle" may refer to the number of complete charge/discharge cycles that the battery is able to support before its capacity falls below 80% of the battery's original capacity.

As used herein, the term "capacity retention" may refer to a measure of the ability of a battery to retain stored energy during an extended open-circuit rest period. In some embodiments, the capacity retention is the remaining capacity after a period of storage of a fully charged battery or battery pack.

As used herein, the term "thermally stable" may refer to the ability to withstand decomposition at high temperatures in fully charged states.

As used herein, the term "discharge capacity" may refer to a measure of the rate at which a battery is discharged relative to its maximum capacity and is a key feature that can reflect the health of a battery. It is often expressed as a C-rate in order to normalize against battery capacity, which is often very different between batteries. A C-rate is a measure of the rate at which a battery is discharged relative to its maximum capacity. A 1C rate means that the discharge current will discharge the entire battery in 1 hour. A low C-rate may be below about 0.5C. A high C-rate may be greater than or equal to about 1C.

As used herein, the terms "capacity fading" or "capacity loss" may refer to a phenomenon observed in rechargeable battery usage where the amount of charge a battery can deliver at the rated voltage decreases with use.

As used herein, the term "voltage fading" may refer to the decrease in average discharge voltage as the material undergoes electrochemical cycling.

The present invention features a composition for a positive electrode material that can be used in a lithium ion battery that allows for high energy density, long life cycle and zero reliance on the toxic cobalt.

The present invention features a composition used in a cathode for a lithium ion battery. In some embodiments, the composition is represented by a formula $Li_aNi_bMn_cTi_dMg_eMo_fNb_gO_h$. In preferred embodiments, the composition with the formula $Li_aNi_bMn_cTi_dMg_eMo_fNb_gO_h$ comprises ratios of elements in a range of: a from about 1 to 1.03; b from about 0.33 to 0.95; c from about 0.01 to 0.666; d from about 0.001 to 0.025; e from about 0.001 to 0.025; f from about 0.001 to 0.025; g from about 0.001 to 0.025; and h from about 1.9 to 2.1. In other embodiments, the range of b may be between about 0.33 to 0.5, 0.4 to 0.55, 0.45 to 0.6, 0.5 to 0.65, 0.55 to 0.7, 0.6 to 0.75, 0.65 to 0.8, 0.7 to 0.85, 0.75 to 0.9, or 0.8 to 0.95. In some embodiments, the respective proportions of the elements in the compositions may vary by plus or minus 10%.

In one embodiment, the composition may be represented by the formula: $LiNi_{0.9}Mn_{0.03}Ti_{0.02}Mg_{0.02}Mo_{0.02}Nb_{0.01}O_2$, $LiNi_{0.8}Mn_{0.13}Ti_{0.02}Mg_{0.02}Mo_{0.02}Nb_{0.01}O_2$, $LiNi_{0.7}Mn_{0.23}Ti_{0.02}Mg_{0.02}Mo_{0.02}Nb_{0.01}O_2$ (HE-Ni70), $LiNi_{0.6}Mn_{0.33}Ti_{0.02}Mg_{0.02}Mo_{0.02}Nb_{0.01}O_2$ (HE-Ni-60), or $LiNi_{0.5}Mn_{0.43}Ti_{0.02}Mg_{0.02}Mo_{0.02}Nb_{0.01}O_2$ (HE-Ni50).

In other embodiments, the cathode material for a Lithium (Li) ion battery with a composition $Li_aNi_bMn_cTi_dMg_eMo_fNb_gO_h$ has a longer life cycle compared to other compositions with the same Ni content, i.e., with the same b value, such as, but not limited to, $LiNi_{0.8}Mn_{0.16}Ti_{0.02}Mg_{0.02}O_2$, $LiNi_{0.8}Mn_{0.1}Co_{0.1}O_2$, $LiNi_{0.6}Mn_{0.3}O$, $LiNi_{0.6}Mn_{0.4}O$, or $LiNi_{0.5}Mn_{0.5}O_2$. As a non-limiting example, the composition may go through 1000 charge/discharge cycles before its capacity falls below 80% of its original capacity. In some embodiments, the composition has a capacity retention of about 98% after 100 charge/discharge cycles. In other embodiments, the composition has a capacity retention of about 85% after 1000 charge/discharge cycles.

In some embodiments, the cathode material for a Lithium (Li) ion battery with a composition $Li_aNi_bMn_cTi_dMg_eMo_fNb_gO_h$ eliminates the toxic, expensive, and single sourced cobalt from the composition. In addition, the composition reduces Ni content, which lowers the cost of the cathode electrode material. Furthermore, there is less change in Ni-metal bond length in the composition, which indicates less strain of the material in the charged state.

In other embodiments, the cathode material for a Lithium (Li) ion battery with a composition $Li_aNi_bMn_cTi_dMg_eMo_fNb_gO_h$ is more thermally stable than other compositions with the same Ni content, i.e., with the same b value, such as, but not limited to, $LiNi_{0.8}Mn_{0.16}Ti_{0.02}Mg_{0.02}O_2$, $LiNi_{0.8}Mn_{0.1}Co_{0.1}O_2$, $LiNi_{0.6}Mn_{0.4}O$, and $LiNi_{0.5}Mn_{0.5}O_2$. In some embodiments, the composition is thermally stable up to about 286° C. In another embodiment, the composition is thermally stable up to about 288° C. In yet another embodiment, the composition is thermally stable up to about 300° C. In other embodiments, the composition is 100° C. more stable compared to a composition with the formula $LiNi_{0.8}Mn_{0.1}Co_{0.1}O_2$ (NMC-811). In another embodiment, the composition is 33° C. more stable than a composition with a formula $LiNi_{0.6}Mn_{0.2}Co_{0.2}O_2$. In yet another embodiment, the composition is 36° C. more stable than a composition with a formula $LiNi_{0.5}Mn_{0.3}C_{0.2}O_2$.

In some embodiments, the cathode material for a Lithium (Li) ion battery with a composition $Li_aNi_bMn_cTi_dMg_eMo_fNb_gO_h$ has a higher capacity than other compositions with the same Ni content, i.e., with the same b value, such as, but not limited to, $LiNi_{0.8}Mn_{0.16}Ti_{0.02}Mg_{0.02}$. In one embodiment, at a low C-rate, the discharge capacity of the composition reaches about 210 mhA/g. In other embodiments, at a high C-rate, the discharge capacity of the composition reaches about 160 mhA/g. As a non-limiting example, at a C/10 rate, the discharge capacity of the composition ranges from about 200 to 210 mhA/g (2.5-4.4V vs Li/Li$^+$). A low C-rate may be below about 0.5C. A high C-rate may be greater than or equal to about 1C.

The present invention features a composition used in a cathode for a lithium ion battery. In some embodiments, the composition is represented by a formula $Li_aMn_bNi_cCo_dTi_eMo_fNb_gTa_hSb_iO_j$. In preferred embodiments, the composition with the formula $Li_aMn_bNi_cCo_dTi_eMo_fNb_gTa_hSb_iO_j$ comprises ratios of elements in a range of: a from about 1.10 to 1.2; b from about 0.45 to 0.65; c from about 0.09 to 0.15; d from about 0.05 to 0.15; e from about 0.001 to 0.02; f from about 0.001 to 0.02; g from about 0.001 to 0.02: h from about 0.001 to 0.02; i from about 0.001 to 0.02; and j from about 1.9 to 2.2. In some embodiments, the respective proportions of the elements in the compositions may vary by plus or minus 10%. In one embodiment, the composition comprises $Li_{1.2}Mn_{0.54}Ni_{0.13}Co_{0.091}Ti_{0.0078}Mo_{0.0078}Nb_{0.0078}Ta_{0.0078}Sb_{0.0078}O_2$.

In other embodiments, the composition having the formula $Li_aMn_bNi_cCo_dTi_eMo_fNb_gTa_hSb_iO_j$ has a longer life cycle than the undoped Li—Mn-rich layered oxide. In one embodiment, the composition has a capacity retention of about 95% after 30 charge/discharge cycles. In some embodiments, the composition having the formula $Li_aMn_bNi_cCo_dTi_eMo_fNb_gTa_hSb_iO_j$ does not experience voltage fading.

In one embodiment, at a low C-rate, the discharge capacity of the composition reaches 282 mhA/g. In other embodiments, at a high C-rate, the discharge capacity of the composition reaches 180 to 210 mhA/g. A low C-rate may be below about 0.5C. A high C-rate may be greater than or equal to about 1C.

The present invention features a method of doping layered cathode materials in lithium ion batteries by using a "high entropy" doping strategy to introduce more than four impurity elements to the host materials. In one embodiment, the present invention features a method for synthesizing a cathode material for a lithium ion battery. In some embodiments, the method comprises: preparing a hydroxide precursor powder; mixing the hydroxide precursor powder with a lithium salt to prepare the cathode material precursor; and calcining the cathode material precursor to form the cathode material. In some embodiments, the cathode material precursor is calcined at 730° C.

In other embodiments, the hydroxide precursor powder is prepared by a method comprising: dissolving nickel salt, manganese salt, magnesium salt, titanium salt, niobium salt, and molybdenum salt in a solvent to make a hydroxide precursor solution; preparing a base solution comprising at least one base dissolved in a solvent; mixing the hydroxide precursor solution with the base solution to produce the hydroxide precursor powder; isolating the hydroxide precursor powder from the solution; and drying the hydroxide precursor powder. In some embodiments, the hydroxide precursor powder is prepared by a method comprising: dissolving nickel salt, manganese salt, cobalt salt, titanium salt, niobium salt, molybdenum salt, tantalum salt, and antimony salt in a solvent to make a hydroxide precursor solution; preparing a base solution comprising at least one base dissolved in a solvent; mixing the hydroxide precursor solution with the base solution to produce the hydroxide precursor powder; isolating the hydroxide precursor powder from the solution; and drying the hydroxide precursor powder. Non-limiting examples of metal salts that may be used to prepare the composition include: $NiSO_4 \cdot 6H_2O$, $MnSO_4 \cdot 4H_2O$, $MgSO_4 \cdot 7H_2O$, a $TiOSO_4$ solution, $Nb(HC_2O_4)_5$, and $(NH_4)_6Mo_7O_{24}$, and LiOH. However, the metal salts are not limited to the aforementioned examples, and may be any suitable metal salt.

As a non-limiting example, HE-Ni50, HE-Ni60 and HE-Ni70 are synthesized using a typical co-precipitation method in a solution of water. A hydroxide precursor with a stoichiometric ratio of $Ni_{0.5}Mn_{0.47}Ti_{0.02}Mg_{0.02}Nb_{0.01}Mo_{0.02}(OH)_2$, $Ni_{0.6}Mn_{0.23}Ti_{0.02}Mo_{0.02}Nb_{0.01}Mo_{0.02}(OH)_2$, or $Ni_{0.7}Mn_{0.23}Ti_{0.02}Mg_{0.02}Nb_{0.01}Mo_{0.02}(OH)_2$ is synthesized. First, $NiSO_4 \cdot 6H_2O$ (99.8%, Fisher), $MnSO_4 \cdot 4H_2O$ (99%, Fisher), $MgSO_4 \cdot 7H_2O$ (98% ACROS), $TiOSO_4$ solution (Sigma-Aldrich), $Nb(HC_2O_4)_5$ (Alfa-Aesar), and $(NH_4)_6Mo_7O_{24}$ (99.98%, Sigma-Aldrich) are dissolved in pure water with a total transition metal (TM) concentration of 1M. The TM solution is mixed uniformly using magnetic stirring for 12 h and stored in an Ar-filled bottle.

Example

The following is a non-limiting example of the present invention. It is to be understood that said example is not intended to limit the present invention in any way. Equivalents or substitutes are within the scope of the present invention.

Synthesis of the Cathode Material

HE-LNMO is synthesized using a typical co-precipitation method in a solution of water. A hydroxide precursor with a stoichiometric ratio of $Ni_{0.8}Mn_{0.13}Ti_{0.02}Mg_{0.02}Nb_{0.01}Mo_{0.02}(OH)_2$ is synthesized. First, $NiSO_4 \cdot 6H_2O$ (99.8%, Fisher), $MnSO_4 \cdot 4H_2O$ (99%, Fisher), $MgSO_4 \cdot 7H_2O$ (98% ACROS), $TiOSO_4$ solution (Sigma-Aldrich), $Nb(HC_2O_4)_5$ (Alfa-Aesar), and $(NH_4)_6Mo_7O_{24}$ (99.98%, Sigma-Aldrich) are dissolved in pure water with a total transition metal (TM) concentration of 1M. The TM solution is mixed uniformly using magnetic stirring for 12 h and stored in an Ar-filled bottle.

A base solution with 2M NaOH and 1.67M $NH_4OH$ is mixed and prepared before the reaction. A portion (30 mL) of the base solution is used as a starting solution. The pH of the starting solution is adjusted to 11.0 via diluted sulfuric acid, and the reaction is started by injecting both TM solution and base solution simultaneously with the flow around 4 mL/min. The product is synthesized by stirring the solution at pH=11.0±0.2, 60° C., and under Ar protection. The laurel-green precipitate is collected via vacuum filtration and washed with pure water to remove the residual ions, and then dried in a vacuum oven at 110° C. Then, the dried TM hydroxide precursor powder is mixed thoroughly with LiOH powder with 5% excess Li as compensation at high temperature. The HE-LNMO precursor is calcined in a tube furnace at 730° C. for 12 h under an oxygen flow of 0.5 L/min.

Electrochemical Test

The electrochemical performances were tested in a CR-2032 coin cell. First, the cathode slurry is prepared by uniformly mixing the active material, super P carbon, and 5% polyvinylidene fluoride (PVDF) in N-methyl-1,2-pyrrolidone (NMP) at a mass ratio of 8:1:1. Second, the well-mixed slurry is coated on Al foil and dried in a vacuum oven overnight at 105° C. The electrode is cut into disks with a diameter of 12 mm, and the mass loading of active material is 2-3 mg/cm². Finally, the coin cell is assembled in an Ar glovebox using a Li chip (D=16.7 mm) as a counter electrode and Celgard-2025 as the separator. The electrolyte is 1M $LiPF_6$ dissolved in EC: EMC=3:7 solvent with 2 wt % vinylene carbonate (VC) as an additive. In the full cell test, the counter electrode is replaced by commercial graphite coated on copper foil. The electrochemical performance is conducted on a NEWARE BTS-4000 battery test system at room temperature (25° C.). The test voltage is 2.5V-4.4V, and the current rate is 0.1C to 2C. GITT is tested using a typical step profile at 0.1C with a 20 min pulse current and 5 min rest. CV and EIS tests are conducted on a PINE workstation, CV is tested from 2.5V-4.5V at 0.1 mV/s scanning speed.

TEM Experiments

The (S)TEM experiments were performed on a transmission electron microscope with a field emission source operated at 200 KeV. The atomic-resolution ADF imaging was performed in high-angle annular dark-field scanning transmission electron microscopy (HAADF-STEM) mode. Energy-dispersive X-ray spectroscopy (EDS) analysis was performed with Super-X EDS detectors integrated into the TEM. The in-situ delithiation experiments were conducted with a Nanofactory STM-TEM holder.

X-Ray Techniques

The hard X-ray absorption spectroscopy of transition metal ions are performed on 7-BM at National Synchrotron Light Source II (NSLS II), Brookhaven National Laboratory. The corresponding XAS data is analyzed by Athena software and the WT-EXAFS is analyzed using HAMA code developed by Harald Funke and Marina Chukalina.

The soft X-ray absorption including TEY and FY mode is performed at beamline 10-1 at Stanford Synchrotron Radiation Lightsource (SSRL), and the energy shift is calibrated by the transition metal foil. The in-situ heating and charging/discharging XRD are performed on beamline 11-ID-C at the Advanced Photon Source (APS). The beamline is optimized for high-energy x-ray diffraction at 105.7 keV. For the in-situ heating, the charged electrode including a current collector (cut off at 4.3V) is fixed on a heating holder. The beam passes through the electrode and the diffraction pattern is recorded on the detector. All the XRD data are calibrated and analyzed by GSAS-II software. TXM imaging is conducted at beamline 18-ID FXI at NSLS II, which offers advanced capabilities for studying the morphology and oxidation states of dynamic systems in 2-D and 3-D with 30 nm resolution.

DSC/TGA Test

All the DSC/TGA samples are charged to 4.4V and heated with 10° C./min speed. For the DSC test, TA instrument DSC Q2000 equipped with an air-fin cooler is applied, providing temperature measurements of materials phase transitions. NETZSCH STA 449 F3 Jupiter is applied for the TGA-MS test, enabling the measurement of temperature and oxygen loss during phase transformation.

Results

The HE-LNMO cathode with a nominal composition of $LiNi_{0.8}Mn_{0.13}Nb_{0.01}Mo_{0.02}Ti_{0.02}Mg_{0.02}O_2$ is prepared by a co-precipitation method. The structure and chemistry of the as-prepared HE-LNMO were comprehensively investigated by multimodal characterization including transmission electron microscopy (TEM) and X-ray diffraction (XRD) techniques.

Figure 4A:
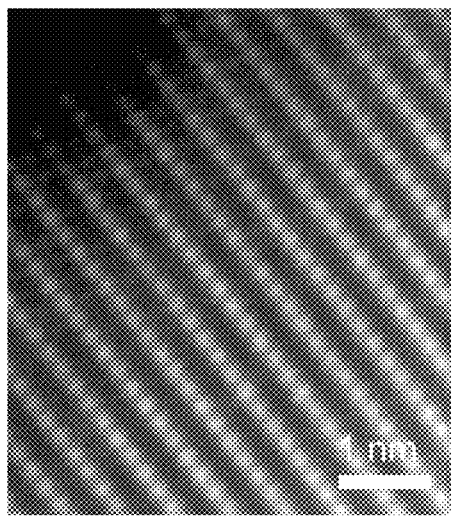
FIGS. 4A-4B show that the $LiNi_{0.8}Mn_{0.13}Ti_{0.02}Mg_{0.02}Mo_{0.02}Nb_{0.01}O_2$ synthesized has a layered oxide structure (space group R-3m), the same as $LiNO_2$ and $LiCoO_2$.
Figure 4B:
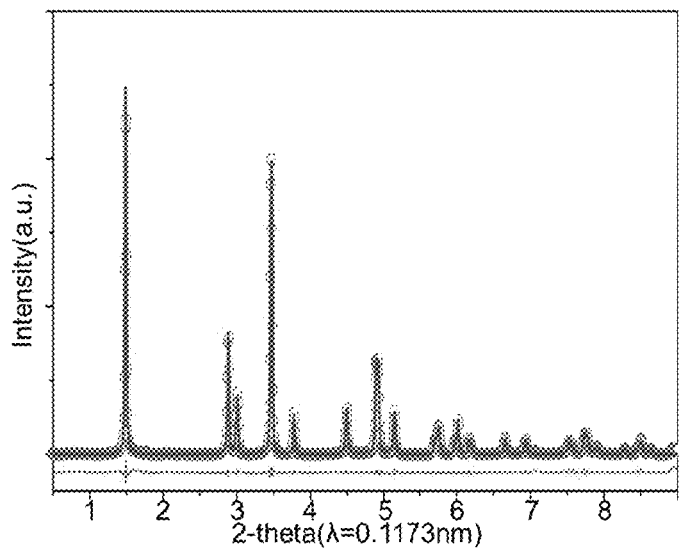

FIG. 4A shows a representative atomic-resolution high-angle annular dark-field (HAADF-STEM) image of a HE-LNMO primary particle along the [100] zone axis. The HAADF-STEM results show that the pristine HE-LMNO has a well-defined layered structure. In contrast to the well-ordered lattice in the bulk, a slight Li/Ni cation mixing is observed at the particle surface, which is similar to that previously reported in other high-Ni cathode materials. Consistent with the TEM results, synchrotron-based powder XRD patterns and Rietveld refinement analyses (FIG. 4B) confirm that HE-LNMO has a layered crystal structure (space group of R-3m) with the lattice parameters of a=b=2.879 Å, and c=14.23 Å, which is close to that of other high-Ni cathodes.

Figure 1A:
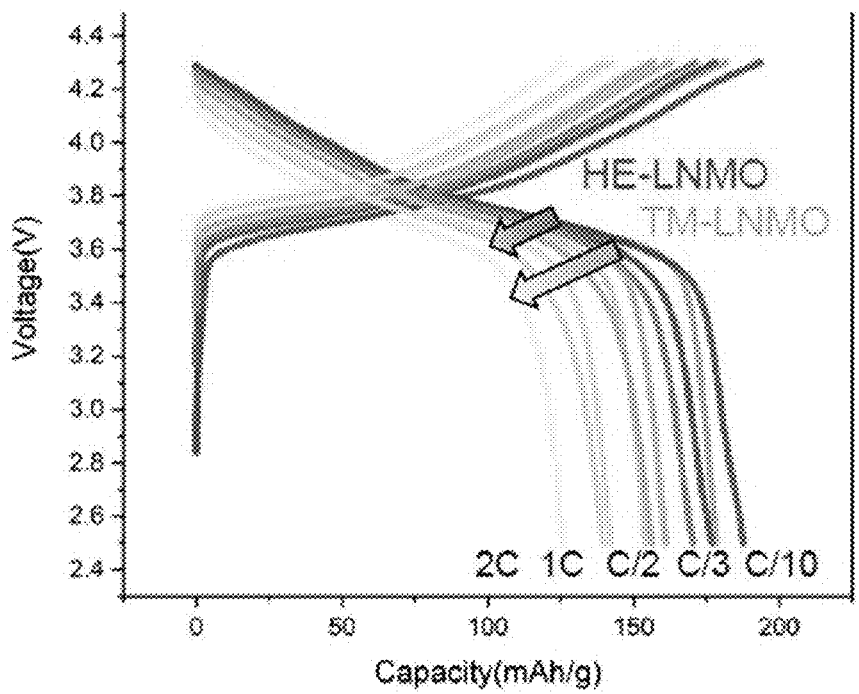
FIG. 1A shows charge/discharging profiles of high-entropy doped $LiNiO_2$ material (red) vs the TiMg-doped material (green); It shows the charging curve is smooth indicating there is no obvious two phase transition.
Figure 1B:
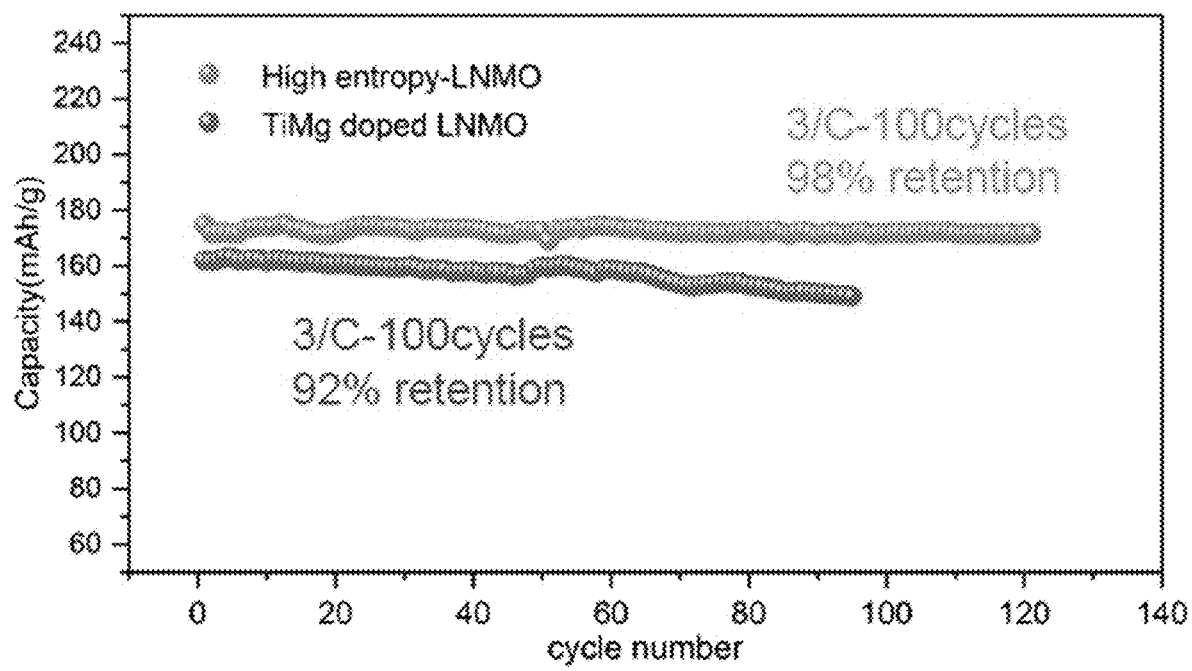
FIG. 1B shows the cycling performance of the high-entropy doped $LiNiO_2$ material (blue) vs the TiMg-doped material (magenta). The cycling performance of the high entropy-doped $LiNiO_2$ is excellent.
Figure 1C:
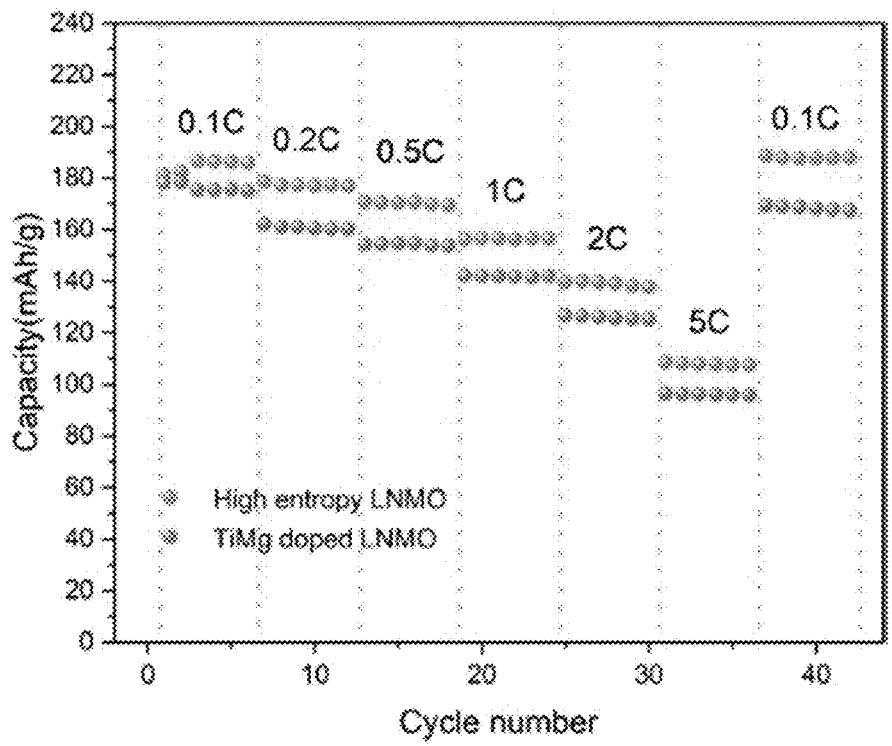
FIG. 1C shows the rate performance of the high entropy-doped $LiNiO_2$ is much better than the TiMg-binary doped material.
Figure 2A:
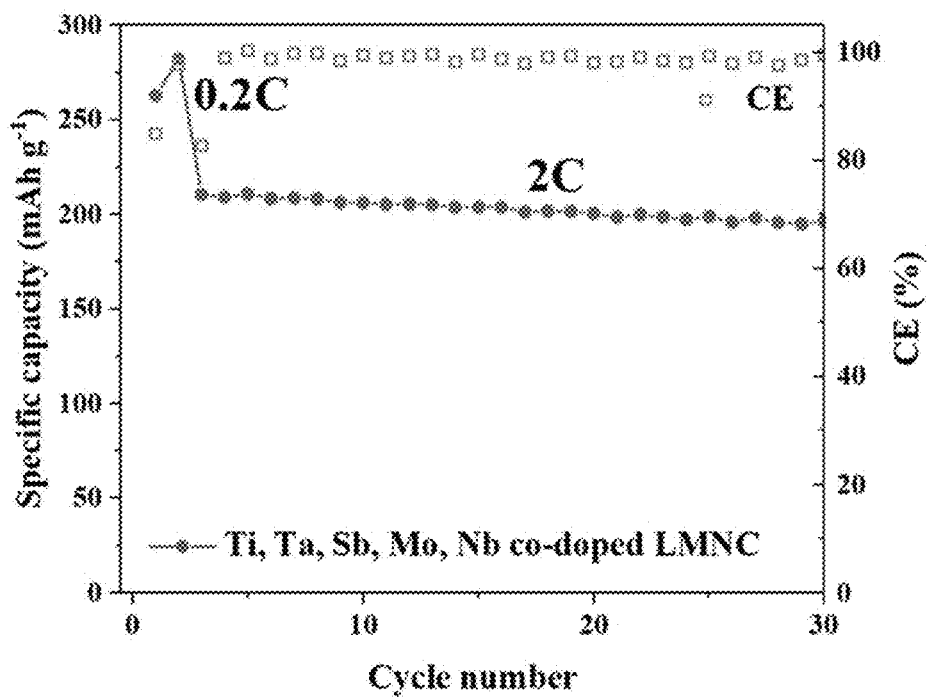
FIGS. 2A-2B show the high-entropy doped Li-rich material has high capacity retention at high charge rate (290 mAh/g at 0.2 C and 205 mAh/g at 2C) and there is very little voltage fade as the material undergoes electrochemical cycling.
Figure 2B:
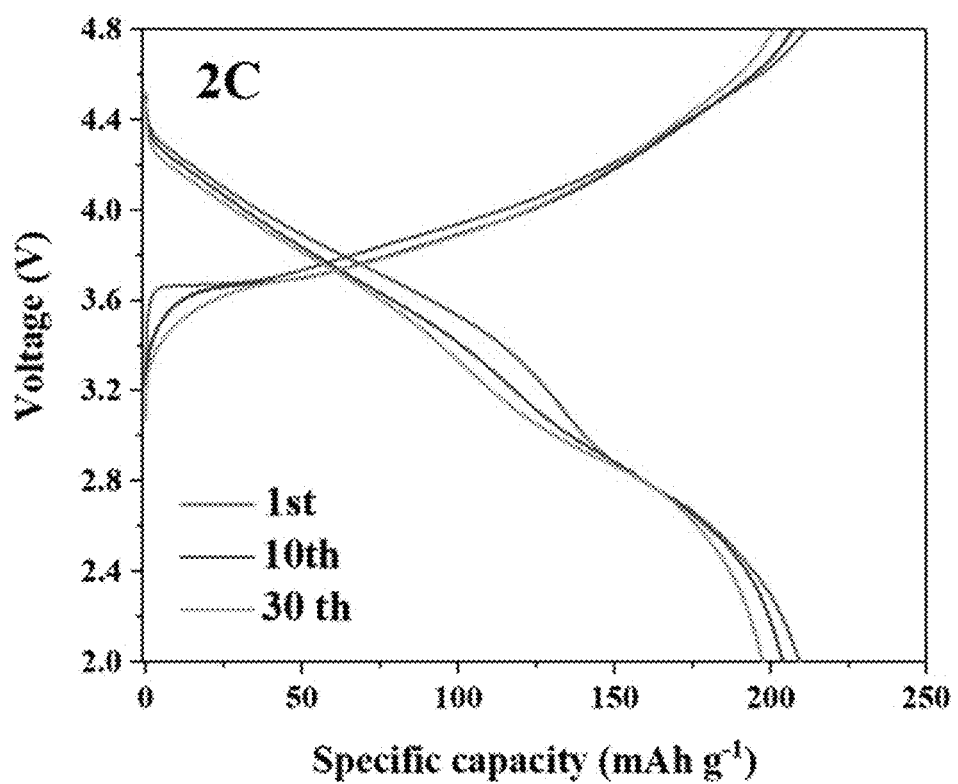
Figure 3:
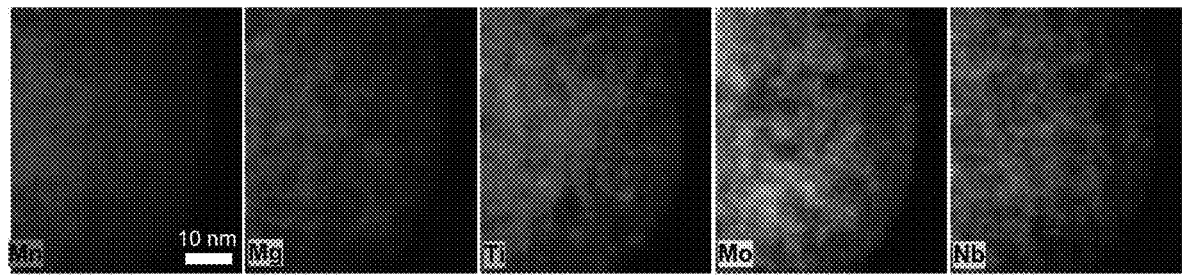
FIG. 3 shows that the $LiNi_{0.33}Mn_{0.13}Ti_{0.02}Mg_{0.02}Mo_{0.02}Nb_{0.01}O_2$ cathode particles contain all of the dopants uniformly.

Energy-dispersive spectroscopy (EDS) analysis mapping was performed to determine the elemental distributions in HE-LNMO. The results (FIG. 3) show that all the transition metals have a nearly homogenous distribution in the particle. Quantification EDS analysis showed that the atomic ratios of the dopants are very close to the designed composition of $LiNi_{0.8}Mn_{0.13}Nb_{0.01}Mo_{0.02}Ti_{0.02}Mg_{0.02}O_2$. In addition, it is worth noting that the contents of Ti, Mo, and Nb dopants in the near-surface region (1~2 nm in thickness) are almost double that of the particle interior.

Figure 5:
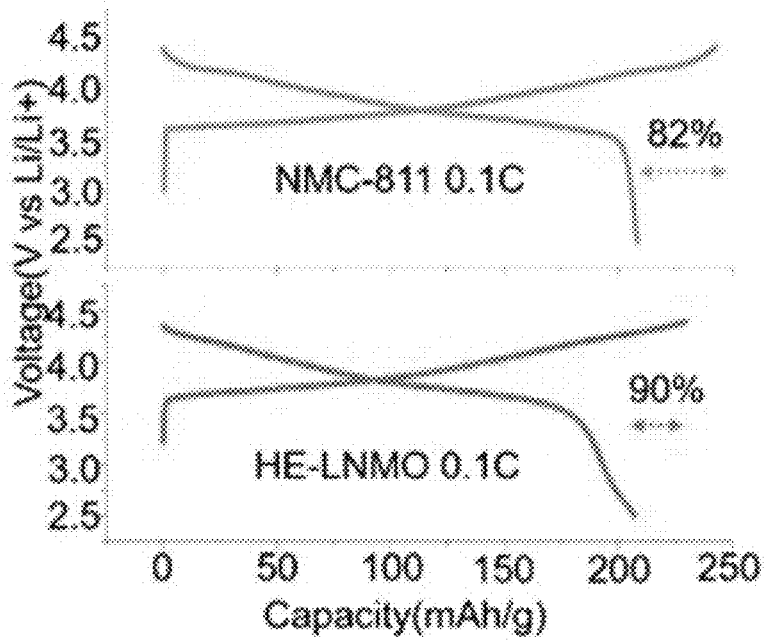
FIG. 5 shows the initial charge/discharge profile and coulombic efficiency of NMC-811 and HE-LNMO

Electrochemical tests were performed to evaluate the performance of the HE-LNMO cathode. As a comparison, commercial NMC-811 cathode was also tested by using identical parameters. The charge/discharge profiles (2.5 V to 4.4 V vs. $Li/Li^+$, FIG. 5) showed that HE-LNMO delivers an initial discharge capacity of 205.5 mAh/g which is comparable to that of the commercial NMC-811 (208.2 mAh/g); in the meantime, the first-cycle Coulombic efficiency (CE) of HE-LNMO reached 90%, significantly improved compared with the 82% of NMC-811. Furthermore, HE-LNMO achieved a specific energy of 789 Wh/kg at 0.1C. It is worth noting that NMC-811 showed a characteristic charge plateau at 4.25 V caused by the H2-H3 phase transformation, which is generally considered as the fingerprint of irreversible structural damage and oxygen release in high-Ni NMC cathodes. In contrast, the detrimental H2-H3 phase transformation in HE-LNMO was significantly suppressed as indicated by the flattened plateau at the same voltage.

The suppressed phase transformation was also validated by cyclic voltammetry experiments. For NMC-811, three separate redox peaks, correlated with H1-M, M-H2, and H2-H3 phase transformations, respectively, were identified during lithiation and delithiation. For HE-LNMO, the M-H2 redox peak was considerably flattened and, in the meantime, the H2-H3 redox peak shifted towards higher potential by 77 mV, suggesting the detrimental phase transformation is 'delayed' in HE-LNMO. Moreover, the polarization difference of reversible H1-M phase transition of HE-LNMO was smaller than that of NMC-811, indicating the more favorable reversibility and $Li^+$ migration. A galvanostatic intermittent titration technique (GITT) experiment confirmed the enhanced $Li^+$ diffusion dynamics. NMC-811 and HE-LNMO with the same specific loading were tested at the same pause current/time. The slightly higher diffusion constants showed that the $Li^+$ diffusion is facilitated in HE-LNMO. This is also consistent with the electrochemical impedance spectroscopy (EIS) results obtained in which HE-LNMO showed lower impedance than that of NMC-811.

Figure 6A:
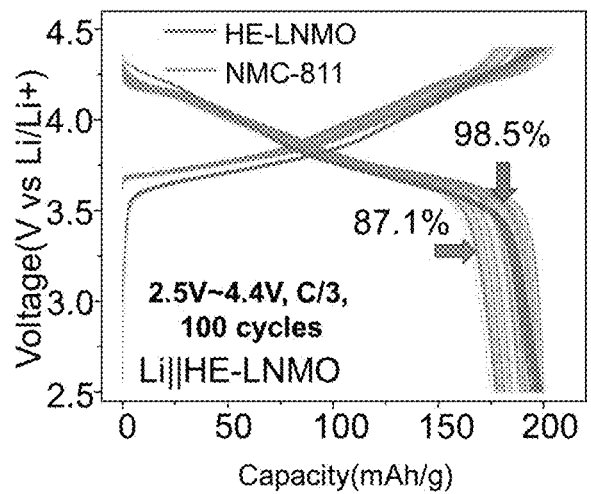
FIGS. 6A-6B show that the $LiNi_{0.8}Mn_{0.13}Ti_{0.02}Mg_{0.02}Mo_{0.02}Nb_{0.01}O_2$ (HE-LNMO) has much better capacity retention when charged to high voltages, 4.4V and 4.5V, respectively, compared to the commercial $LiNi_{0.8}Mn_{0.13}Ti_{0.02}Mg_{0.02}Mo_{0.02}Nb_{0.01}O_2$ (NMC-811) material.
Figure 6B:
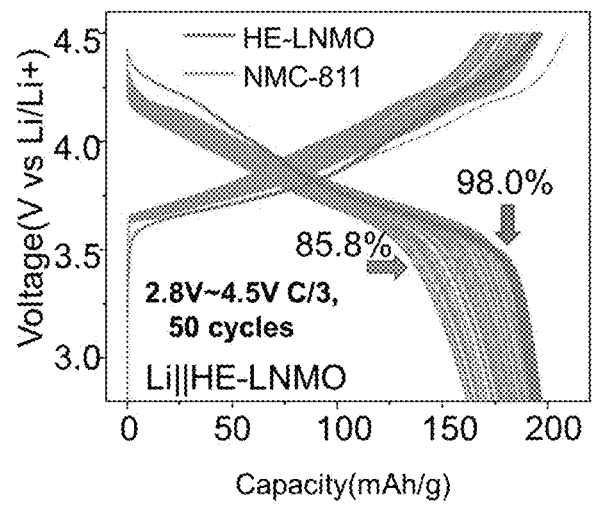
Figure 6C:
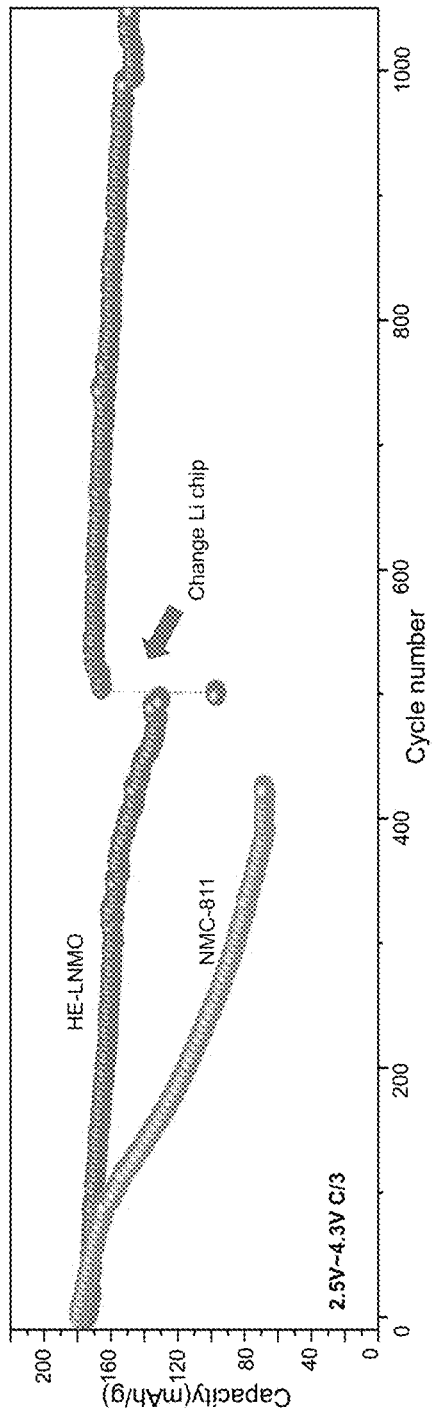
FIG. 6C shows that the $LiNi_{0.8}Mn_{0.13}Ti_{0.02}Mg_{0.02}Mo_{0.02}Nb_{0.01}O_2$ (HE-LNMO) has a much better life cycle than that of the commercial $LiNi_{0.8}Mn_{0.1}Co_{0.1}O_2$ (NMC-811) material. The life cycle reaches more than 1000 cycles with a capacity retention of 85% at 1000 cycles.

FIGS. 6A-6B show the long-term cycling performances of HE-LNMO in both half-cells and full-cells. HE-LNMO showed remarkable capacity retention at different cut-off voltages, for example, 98.5% capacity retention after 100 cycles at 2.5-4.4V, and 98% capacity retention after 50 cycles at 2.8-4.5V. Even after 1000 cycles at 2.5-4.3V, 85% capacity was retained in half-cells (FIG. 6C), demonstrating an excellent cycling performance compared with commercial NMC-811. In sharp contrast, NMC-811 only showed 87.1% retention after 100 cycles at 2.5-4.4V, and 85.8% retention after 50 cycles at 2.8-4.5V. Furthermore, in full-cell electrochemical tests, HE-LNMO also showed excellent cycling performance at different cut-off voltages (FIG. 7), e.g., 99.5% retention at 2.5-4.2V and 98.9% at 2.5-4.3V after 100 cycles, comparable with the state-of-the-art high-Ni cathode.

Comprehensive structural characterizations were performed to understand the rationale behind the superior cycling stability of HE-LNMO. In the X-ray absorption near edge structure (XANES) of Ni in HE-LNMO and NMC-811 after $100^{th}$ cycles, it was seen that the Ni—K edge of the cycled HE-LNMO nearly overlapped with that of the pristine sample: in contrast, the Ni—K edge in cycled NMC-811 evidently shifted to higher energy compared with its pristine counterpart. This suggested HE-LNMO had better reversibility than NMC-811. Furthermore, the Fourier transformed extended X-ray absorption fine structures (FT-EXAFS) of the Ni—K edge was employed to investigate the TM-O bonds in both cathodes. The results showed that both Ni—O and Ni-TM coordination distances in NMC-811 were noticeably shortened after long cycling, indicating the lattice shrinkage and lithium vacancies generated during cycling. However, these interatomic peak shifts were almost negligible in cycled HE-LNMO, implying the highly stable local coordinate environment.

In addition to the Ni—K edge, the stability of doping elements Mn, Ti, Nb, and Mo were also investigated using XANES. The results showed that Ni, Mn, and Ti edges in 100th cycled HE-LNMO were identically overlapped with the pristine sample. For Nb and Mo, a slight edge shift towards low energy was observed after cycling, indicating that the oxygen vacancies formed during cycling intended to be "trapped" around these high-valence doping elements which led to the reduced oxygen loss around Ni.

Since the coordination change was closely related to the oxygen-release in the high-Ni cathode, wavelet-transformed EXAFS was applied to probe the Ni—O coordination. The Ni—O bonding in NMC-811 was extended along the high-k direction compared with HE-LNMO, suggesting more oxygen-related defects were formed in NMC-811. Meanwhile, the soft X-ray absorption spectrum of the Ni-L3 edge was applied to study the surface oxygen loss in HE-LNMO and NMC-811. Compared with NMC-811, HE-LNMO showed higher $Ni^{3+}$ proportion in TEY mode, and lower $Ni^{3+}/Ni^{2+}$ ratio difference between TFY mode and TEY mode. The results suggested that HE-LNMO had better charge/discharge homogeneity, and less surface oxygen loss compared with NMC-811. The results of the SAED of the pristine and $500^{th}$-cycled HE-LNMO along the [100] zone axis indicated that HE-LNMO maintained a perfect O3 structure with a small amount of cation mixing, which was similar to that in the pristine particles. The O1 stacking-faults (SFs) which widely exist in high-Ni cathodes were not evidently observed in the $500^{th}$-cycled HE-LNMO particles. XRD patterns and lattice refinement showed that after $100^{th}$ cycles, both a and c of HE-LNMO show much lower strain (−0.24% and 0.36%, respectively) compared with that of NMC-811 (−1.2% and 0.49%, respectively). EDS mapping analysis of the $1^{st}$ cycled and long-cycled HE-LNMO showed similar compositional distributions as that of the pristine particles, indicating the superior chemical stability of HE-LNMO.

Synchrotron-based in-situ and ex-situ XRD was applied to quantify the lattice parameters change during lithiation/delithiation. The lattice parameters (FIGS. 9A-9B) and volume variation at different cut-off voltages during the first delithiation were calculated based on the refinement of both the in-situ and ex-situ XRD data (FIG. 9C). The results showed that for HE-LNMO, the maximum changes of a and c axes were as low as 0.5% and 0.9%, respectively, both of which are less than 1%. While, for NMC-811, the corresponding values were 1.9% and 2.1%, respectively, which are nearly two to four times larger than that of HE-LNMO. Furthermore, the maximum volume changes of HE-LNMO and NMC-811 were ~0.3% and ~2.7% (FIG. 9B). This indicates that the volume change of the HE-LNMO (~0.3%), which is nearly an order of magnitude smaller than that of the NMC-811 (~2.7%), reached beyond the 'zero strain' state (volume change <1%).

A remarkable trade-off between the capacity and stability (strain) of cathodes with different Ni content is observed. Although high-Ni content cathodes enable higher capacities, it inevitably results in exacerbated intrinsic volume strain of the cathodes, ultimately leading to poor stability and severe safety problems. In sharp contrast to conventional cathodes, the HE-LNMO cathode of the present invention, by realizing high capacity and zero-strain simultaneously, breaks the 'capacity-stability' trade-off. To understand the atomic-scale mechanisms behind the improved stability of HE-LNMO, in-situ delithiation experiments in TEM were performed on HE-LNMO primary particles in comparison with the parental phase of high-Ni cathodes—$LiNiO_2$ (LNO), which is supposed to have large volume change during delithiation.

Atomic-resolution images and corresponding strain analyses of in-situ delithiated HE-LNMO and LNO primary particles were collected. HE-LNMO remained nearly defect-free and strain-free during delithiation, while in contrast, large amounts of dislocations were formed in delithiated LNO. The suppression of defect generation significantly reduced the local strain concentration inside primary particles during operation and thereby validated the robust structural stability of the zero-strain HE-LNMO cathode. Furthermore, the stability of HE-LNMO was evaluated by TXM tomography at the secondary-particle level. After cycling, substantial intergranular cracks formed inside the NMC-811 cathode, while in contrast, no obvious cracks were observed in the HE-LNMO cathode. High-resolution SEM cross-section imaging was further performed on both cathodes, and the results were in good agreement with those obtained by the TXM tomography.

To evaluate the thermal stability of HE-LNMO in comparison to NMC-811, in-situ heating techniques, differential scanning calorimetry (DSC), and mass spectroscopy (MS) were employed to monitor the degradation of the delithiated particles (cut-off at 4.3V) under thermal abuse conditions. In-situ heating experiments in TEM showed that severe nano-cracks were generated in NMC-811 primary particles after being heated to 350° C., whereas only tiny voids were observed in HE-LNMO at the same heating condition. Moreover, EDS analysis showed that the dopant distributions in the HE-LNMO after thermal abuse remained unchanged compared with that of the pristine particles, indicating the outstanding chemical stability of HE-LNMO.

In-situ heating XRD was further employed to track the phase transformation pathway of the delithiated HE-LNMO under thermal abuse conditions (temperature target of 45° C. with a heating rate of 1° C./min). In contrast to NMC-811 whose layered to spinel transformation temperature is about 155° C., HE-LNMO had a superb thermal tolerance with a layered to spinel transformation temperature of about 230° C. A significant increase of nearly 80° C. makes the thermal stability of HE-LNMO comparable to the ultra-stable NMC-532, which has a layered to spinel transformation of 235° C. and a much lower Ni content. FIG. 8A shows the DSC profiles of a series of Ni-rich cathodes with different Ni contents. With an increase of the Ni content (from NMC-532 to NMC-811), the thermal stability significantly decreases, which is consistent with the trend that the phase transition temperature decreases with increased Ni content. Exceptionally, for the HE-LNMO which has exactly the same Ni-content (80%) as that in NMC-811, it delivered a remarkable maximum heat flow at 286° C., which is close to the maximum heat flow of NMC-532 (292° C.) and is considerably higher than that of NMC-811 (230° C.). Consistent with the DSC results and the in-situ heating XRD, TGA-MS results (FIG. 8B) further confirm the superior thermal stability of HE-LNMO over NMC-811, whereby the maximum oxygen release temperature of HE-LNMO is delayed by about 100° C. compared to NMC-811.

CONCLUSION

High-entropy materials are an emerging class of novel materials composed of a large number of components. Through the combination of multiple principal elements, the configurational entropy can be maximized and robust properties can be achieved. Stimulated by the emerging concept of entropy stabilization in metallic alloys, the strategy was rapidly extended to oxide systems for energy storage. However, due to the fact that high-Ni content provides the only route for high-energy-density layered oxide cathodes, the conventional near-equimolar strategy becomes not feasible. Yet, inspired by the idea of conventional high-entropy stabilization strategies, a proof of concept was demonstrated that showed compositionally complex doping is capable to stabilize high-Ni layered oxides through accommodating the volumetric and structural changes of the host O3 lattice during repeated $Li^+$ intercalation/deintercalation, without sacrificing their capacities. The significantly enhanced structural stability and life cycle can be attributed to the following aspects: (1) mitigated surface oxygen loss due to the pinning effects of the hierarchically and randomly distributed dopants; (2) reduced lattice expansion/contraction and defects generation through strain accommodation by different chemical environments; (3) suppressed cation mixing through solute-drag effects of the multi-component dopants in TM layers. The intrinsically enhanced stability through high-entropy doping ensures the superior stability of HE-LNMO cathode in both the long-term cycling conditions and thermal abuse conditions.

The large volume change which ubiquitously exists in high-Ni cathode materials may cause both structural degradations and mechanical failures of the cathodes. For example, the large lattice contraction along the c axis unavoidably results in the detrimental O1 stacking faults/phase and thereby the deactivation of high-Ni cathode due to the high energy barrier for $Li^+$ to intercalate back into the lattice. On the other hand, local strain concentration originating from heterogeneous volume change could directly cause mechanical failure of the cathodes via the formation of multiscale cracks (including both intergranular cracking and intragranular cracking). A zero-strain high-Ni cathode for LIBs is prepared through a novel high-entropy doping strategy. By pushing the volume change of the high-Ni cathodes far below 1%, the trade-off between the capacity and stability of high-Ni cathodes is broken and their structural and mechanical stabilities simultaneously improve. This opens the possibility of optimizing current high-Ni cathodes through controlled combinations of multiple dopants.

In conclusion, a high-entropy doping strategy is proposed to fabricate a zero-strain high-Ni and Co-free layered cathode with superior structural/mechanical stability and long life cycle. Through the synergistic effects of the compositionally complex dopants, the lattice strain of the high-Ni cathode during operation is pushed down to an unprecedented 0.3%, far below the critical value of zero-strain (1%). The significantly reduced lattice strain leads to an ultra-stable lattice structure that can effectively resist chemomechanical cracking as well as lattice defects during long-term cycling. Moreover, due to the pinning effects of randomly distributed dopants, the oxygen loss and detrimental phase transformation are considerably mitigated and leads to superior structural stability in both harsh long-cycle chemomechanical conditions and thermal abuse conditions.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A composition used in a cathode for a lithium ion battery, the composition represented by a formula $Li_aNi_bMn_cTi_dMg_eMo_fNb_gO_h$, wherein
   a ranges from about 1 to 1.03,
   b ranges from about 0.33 to 0.95,
   c ranges from about 0.01 to 0.666,
   d ranges from about 0.001 to 0.025,
   e ranges from about 0.001 to 0.025,
   f ranges from about 0.001 to 0.025,
   g ranges from about 0.001 to 0.025, and
   h ranges from about 1.9 to 2.1.

2. The composition of claim 1, wherein the composition has a formula $LiNi_{0.9}Mn_{0.03}Ti_{0.02}Mg_{0.02}Mo_{0.02}Nb_{0.01}O_2$, $LiNi_{0.8}Mn_{0.13}Ti_{0.02}Mg_{0.02}Mo_{0.02}Nb_{0.01}O_2$, $LiNi_{0.7}Mn_{0.23}Ti_{0.02}Mg_{0.02}Mo_{0.02}Nb_{0.01}O_2$, $LiNi_{0.6}Mn_{0.33}Ti_{0.02}Mg_{0.02}Mo_{0.02}Nb_{0.01}O_2$, or $LiNi_{0.5}Mn_{0.43}Ti_{0.02}Mg_{0.02}Mo_{0.02}Nb_{0.01}O_2$.

3. The composition of claim 1, wherein the composition is thermally stable up to about 286° C.

4. The composition of claim 1, wherein the composition has a capacity retention of about 98% after 100 charge/discharge cycles.

5. The composition of claim 1, wherein the composition has a capacity retention of about 85% after 1000 charge/discharge cycles.

6. The composition of claim 1, wherein at a low C-rate, the discharge capacity reaches about 210 mhA/g.

7. The composition of claim 1, wherein at a high C-rate, the discharge capacity reaches about 160 mhA/g.

8. A composition used in a cathode for a lithium ion battery, the composition comprising: $Li_aMn_bNi_cCo_dTi_eMo_fNb_gTa_hSb_iO_j$, wherein
   a ranges from about 1.10 to 1.2,
   b ranges from about 0.45 to 0.65,
   c ranges from about 0.09 to 0.15,
   d ranges from about 0.05 to 0.15,
   e ranges from about 0.001 to 0.02,
   f ranges from about 0.001 to 0.02,
   g ranges from about 0.001 to 0.02,
   h ranges from about 0.001 to 0.02,
   i ranges from about 0.001 to 0.02, and
   j ranges from about 1.9 to 2.2.

9. The composition of claim 8, wherein the composition has a formula $Li_{1.2}Mn_{0.54}Ni_{0.13}Co_{0.091}Ti_{0.0078}Mo_{0.0078}Nb_{0.0078}Ta_{0.0078}Sb_{0.0078}O_2$.

10. The composition of claim 8, wherein the composition has a longer life cycle compared to an undoped Li—Mn-rich layered oxide.

11. The composition of claim 8, wherein the composition has a capacity retention of about 95% after 30 charge/discharge cycles.

12. The composition of claim 8, wherein the composition does not undergo voltage fading.

13. The composition of claim 8, wherein at a low C-rate, the discharge capacity reaches about 282 mhA/g.

14. The composition of claim 8, wherein at a high C-rate, the discharge capacity reaches about 180 mhA/g.

15. The composition of claim 8, wherein at a C-rate of 5C, the composition has a capacity retention that reaches about 210 mhA/g.

16. A method of synthesizing a composition used in a cathode material for a lithium ion battery, the method comprising:
   a. preparing a hydroxide precursor powder;
   b. mixing the hydroxide precursor powder with a lithium salt to prepare the cathode material precursor; and
   c. calcining the cathode material precursor to form the cathode material.

17. The method of claim 16, wherein the hydroxide precursor powder is prepared by a method comprising:
   a. dissolving nickel salt, manganese salt, magnesium salt, titanium salt, niobium salt, and molybdenum salt in a solvent to make a hydroxide precursor solution;
   b. preparing a base solution comprising at least one base dissolved in a solvent;
   c. mixing the hydroxide precursor solution with the base solution to produce the hydroxide precursor powder;
   d. isolating the hydroxide precursor powder from the solution; and
   e. drying the hydroxide precursor powder.

18. The method of claim 16, wherein the hydroxide precursor powder is prepared by a method comprising:
   a. dissolving nickel salt, manganese salt, cobalt salt, titanium salt, niobium salt, molybdenum salt, tantalum salt, and antimony salt in a solvent to make a hydroxide precursor solution;
   b. preparing a base solution comprising at least one base dissolved in a solvent;
   c. mixing the hydroxide precursor solution with the base solution to produce the hydroxide precursor powder;
   d. isolating the hydroxide precursor powder from the solution; and
   e. drying the hydroxide precursor powder.

19. The method of claim 16, wherein the cathode material precursor is calcined at 730° C.

* * * * *